Nov. 3, 1925.
A. C. ANTOINE
RADIUS ROD SUPPORT
Filed Aug. 11, 1924
1,559,661
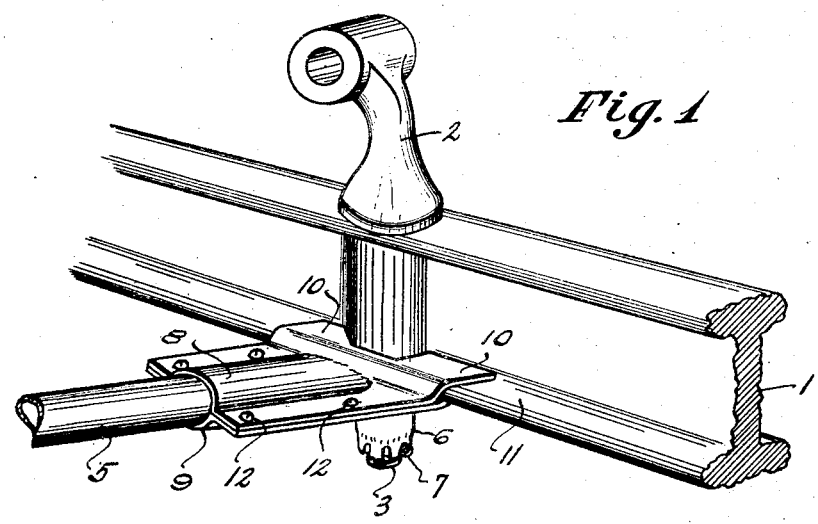
Fig. 1
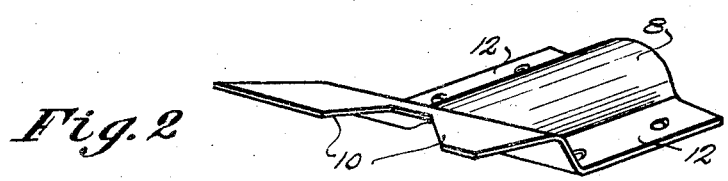
Fig. 2
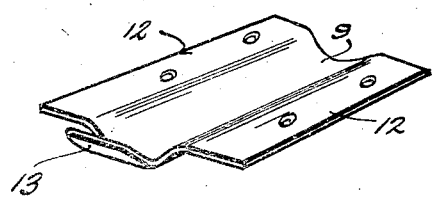
Fig. 3
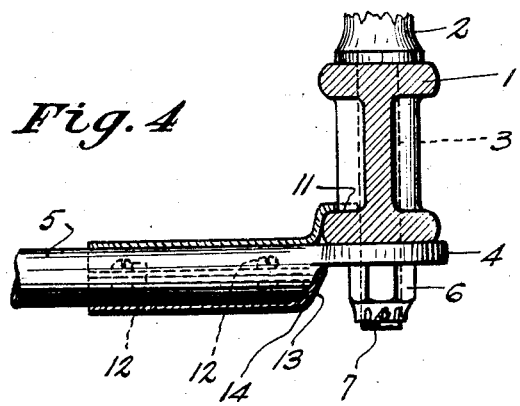
Fig. 4
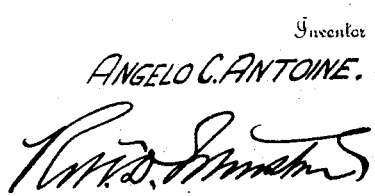
Inventor
ANGELO C. ANTOINE.
By
Attorney Patented Nov. 3, 1925.

1,559,661

UNITED STATES PATENT OFFICE.

ANGELO C. ANTOINE, OF MOBILE, ALABAMA.

RADIUS-ROD SUPPORT.

Application filed August 11, 1924. Serial No. 731,388.

*To all whom it may concern:*

Be it known that I, ANGELO C. ANTOINE, a citizen of the United States of America, residing at Mobile, in the county of Mobile and State of Alabama, have invented certain new and useful Improvements in Radius-Rod Supports, of which the following is a specification.

My invention relates to a radius rod support in the form of an attachment which can be readily applied to existing automobiles and which when clamped in place will prevent the radius rod falling down and causing an accident should its end, which is pivotally connected to the front axle, become loosened.

More particularly the object of my invention is to design a very simple and inexpensive stamp clamp which can be readily applied to existing cars without change of parts or requiring skilled labor, and which will so embrace the radius rod and so engage the axle that they will support the radius rod from the axle should the rod become loosened from its pivotal connection to the axle.

My invention further comprises the novel details of construction and arrangements of parts, which in their preferred embodiment only are illustrated in the accompanying drawings which form a part of this specification, and in which:—

Fig. 1 is a perspective view illustrating a portion of the front axle showing the radius rod supporting attachment in operating position.

Figs. 2 and 3 are front detail perspective views of the upper and lower clamp elements, respectively.

Fig. 4 is a cross-sectional view through the axle showing the clamp in cross section and the radius rod in elevation.

Similar reference numerals refer to similar parts throughout the drawings.

My invention, as illustrated, is shown associated with a front axle 1 of an automobile having a spring perch 2, the threaded shank of which passes down through the axle and through a hole in the flattened end 4 of the radius rod 5. A turret nut 6 is screwed on the perch shank and is usually held in place by a cotter key 7. Should the key work out or be left off or the nut work off the perch shank the radius rod will drop and, due to its position on the car, it might cause a serious accident. My attachment is designed to prevent this happening and to this end I provide a pair of clamp elements 8 and 9, the upper element 8 having a semi-cylindrical body portion adapted to fit about the upper half of the radius rod and having a pair of end jaws 10 which are bent up and shaped to overlap the bottom flange 11 of the axle 1 on each side of the enlargement therein for the reception of the perch shank hole. This element 8 has laterally extended perforated side flanges adapted to receive bolts 12 which pass through similar flanges on the under clamp element 9. This latter element 9 is provided with a semi-circular body portion adapted to conform to and embrace the lower half of the radius rod and to be firmly clamped thereto by the clamp bolts 11. At the forward end of the clamp member 9 is provided an upturned tongue 13 shaped to fit about the shoulder 14 left at the end of the radius rod when the latter is flattened out. By the engagement of this tongue with this shoulder of the radius rod the attachment when once firmly clamped to the radius rod, will be held against longitudinal slippage thereon and thus the upper jaws 10 will be held in position resting on the axle flange and supporting the radius rod, notwithstanding the loss of the supporting nut 6. From the construction of parts it is obvious that the clamp can be applied without skilled labor to the radius rod as it is normally connected up and without change, thus making the device simple of application and, due to the fact that the clamp elements can be made of sheet metal stampings, of relatively low cost.

Obviously the peculiar design of the clamp may require modification for different shapes of axle and radius rods, but the principle of construction governing the design will make obvious the changes necessary to adapt the attachment to different cars.

Without, therefore, limiting myself to the specific details of construction shown, what I claim as new, is:—

1. A radius rod attachment of the character described, comprising a pair of elements, means to clamp them about the radius rod adjacent to the axle, means on one element forming a shoulder adapted to engage a shoulder on the radius rod so as to positively prevent endwise slippage thereon away from the axle, and means on the other element adapted to overhang a part of the axle, as and for the purposes described.

2. In a device of the character described, the combination with an axle and a radius rod pivotally connected thereto, of an enlargement on the axle adapted to receive the means for connecting the radius rod thereto, a clamp adapted to be applied to the pivoted end of the radius rod and having an element overhanging the axle and bifurcated to straddle said enlargement of the axle, and means to prevent the endwise slippage of the clamp on the rod to disengage said element from the axle.

3. The combination with a radius rod having a flattened perforated eye and a shoulder at its axle engaging end, of a support adapted to be clamped to said end of the radius rod and comprising an upper section disposed to overhang the axle, and a lower section having means to positively engage said end of the radius rod to prevent endwise movement of the assembled support on the radius rod away from the axle.

In testimony whereof I affix my signature.

ANGELO C. ANTOINE.